(Model.)
6 Sheets—Sheet 1.
C. LIDREN.
HARVESTER RAKE.
No. 278,979. Patented June 5, 1883.
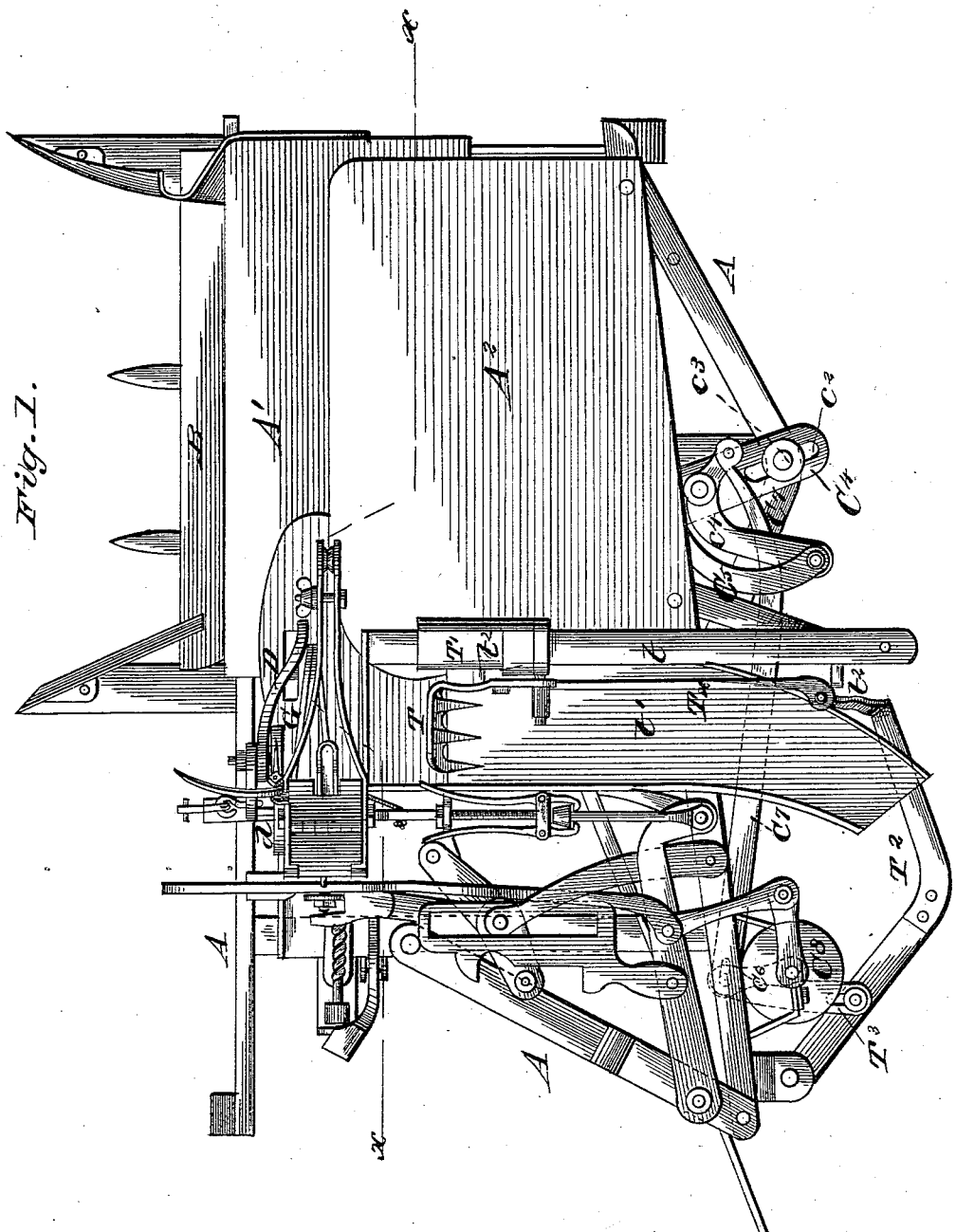
Witnesses:
Phil. C. Dietrich
W. R. Keyworth
Inventor:
Christopher Lidren
by Wm. Alexander
Attorney.

(Model.)
6 Sheets—Sheet 2
C. LIDREN.
HARVESTER RAKE.
No. 278,979. Patented June 5, 1883.
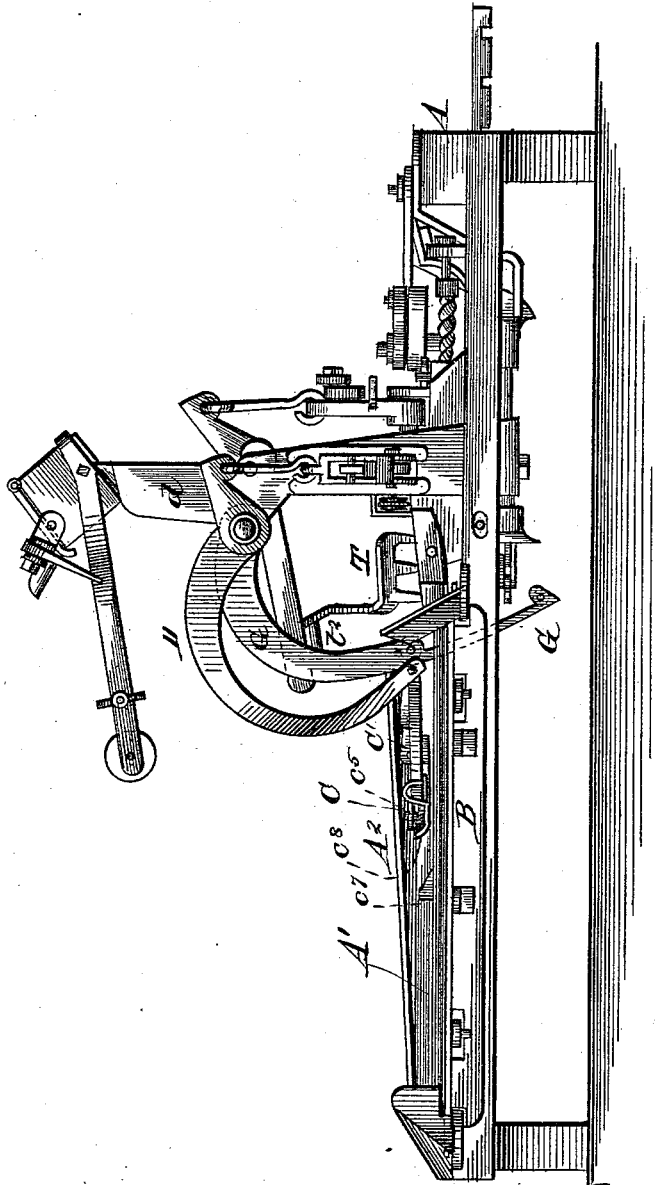

(Model.)
C. LIDREN.
HARVESTER RAKE.
No. 278,979. Patented June 5, 1883.
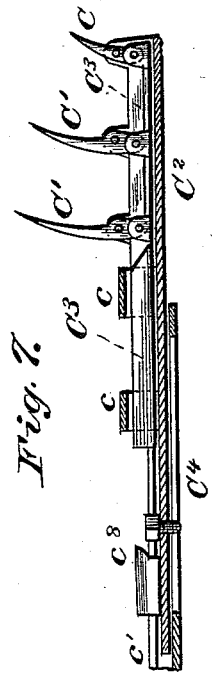
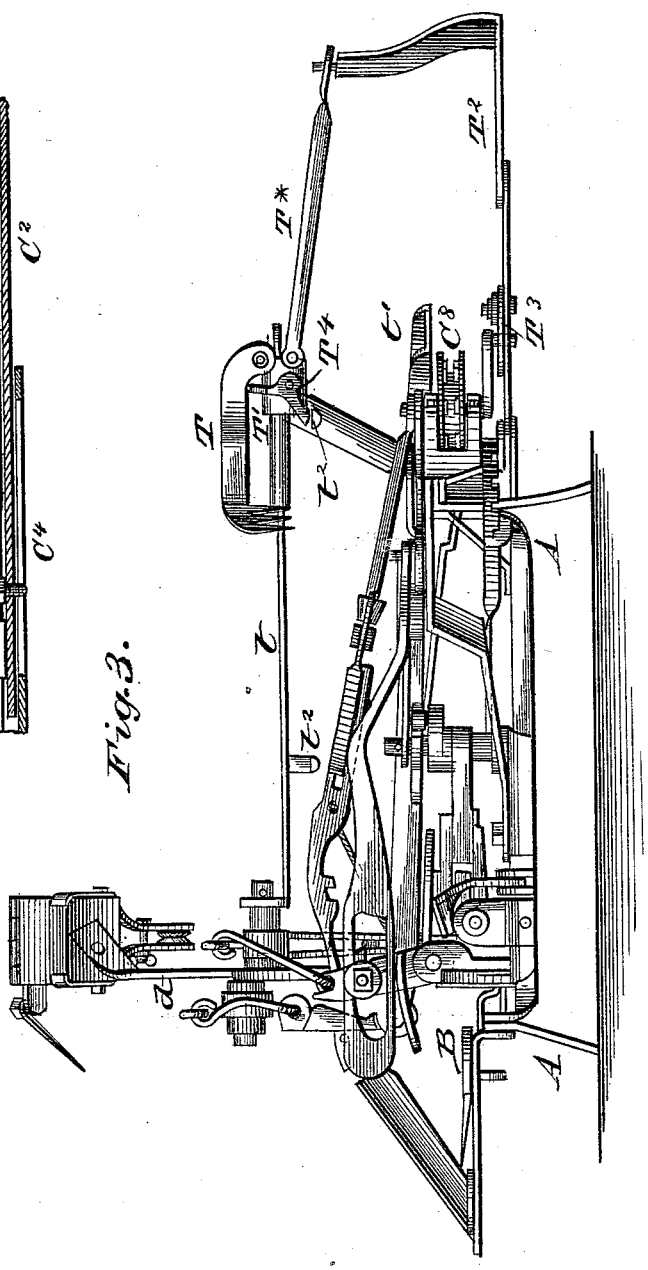
Witnesses:
Phil. C. Dietrich
W. R. Keyworth
Inventor:
Christopher Lidren
per.
J. M. Alexander
Attorney.

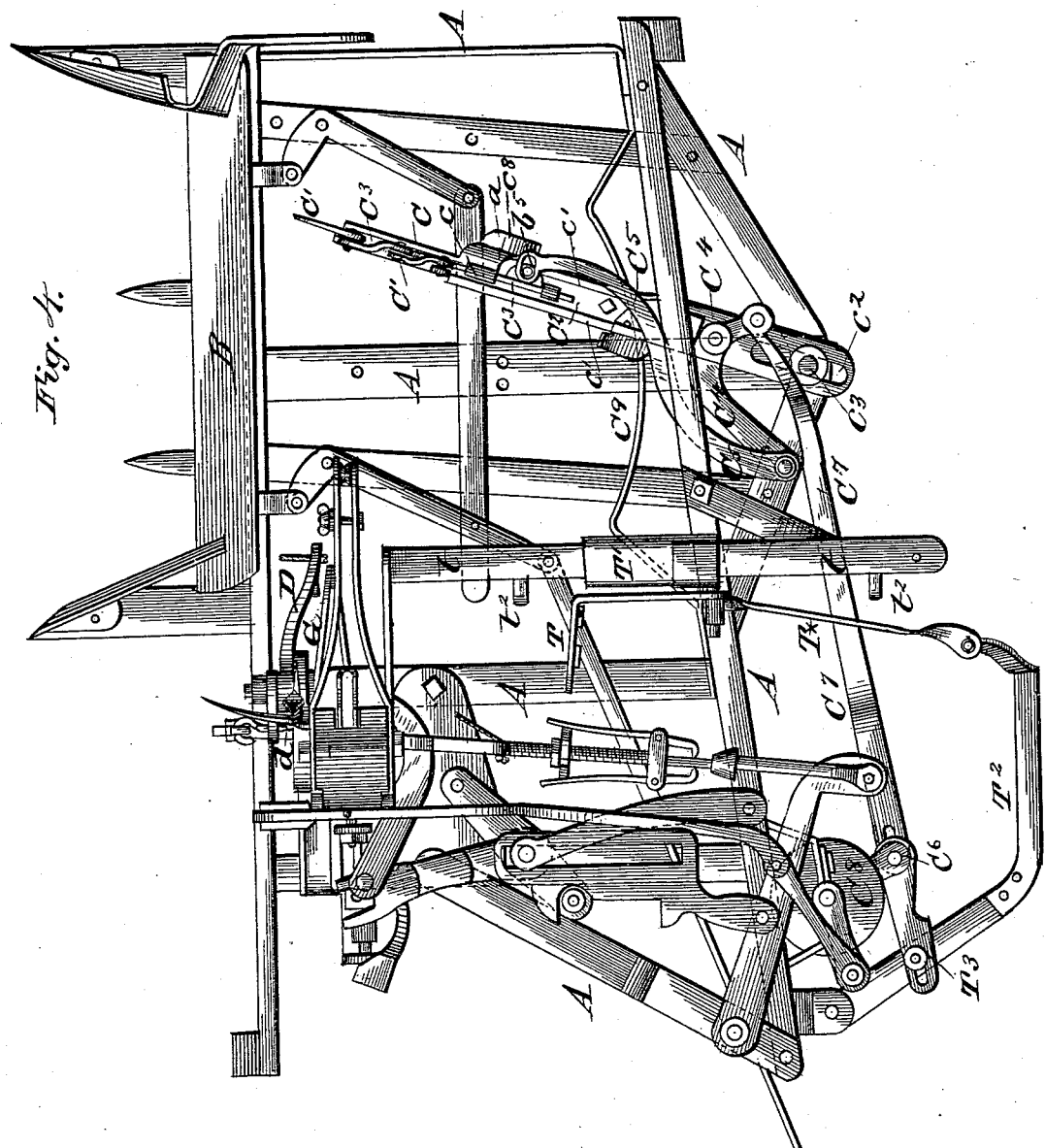

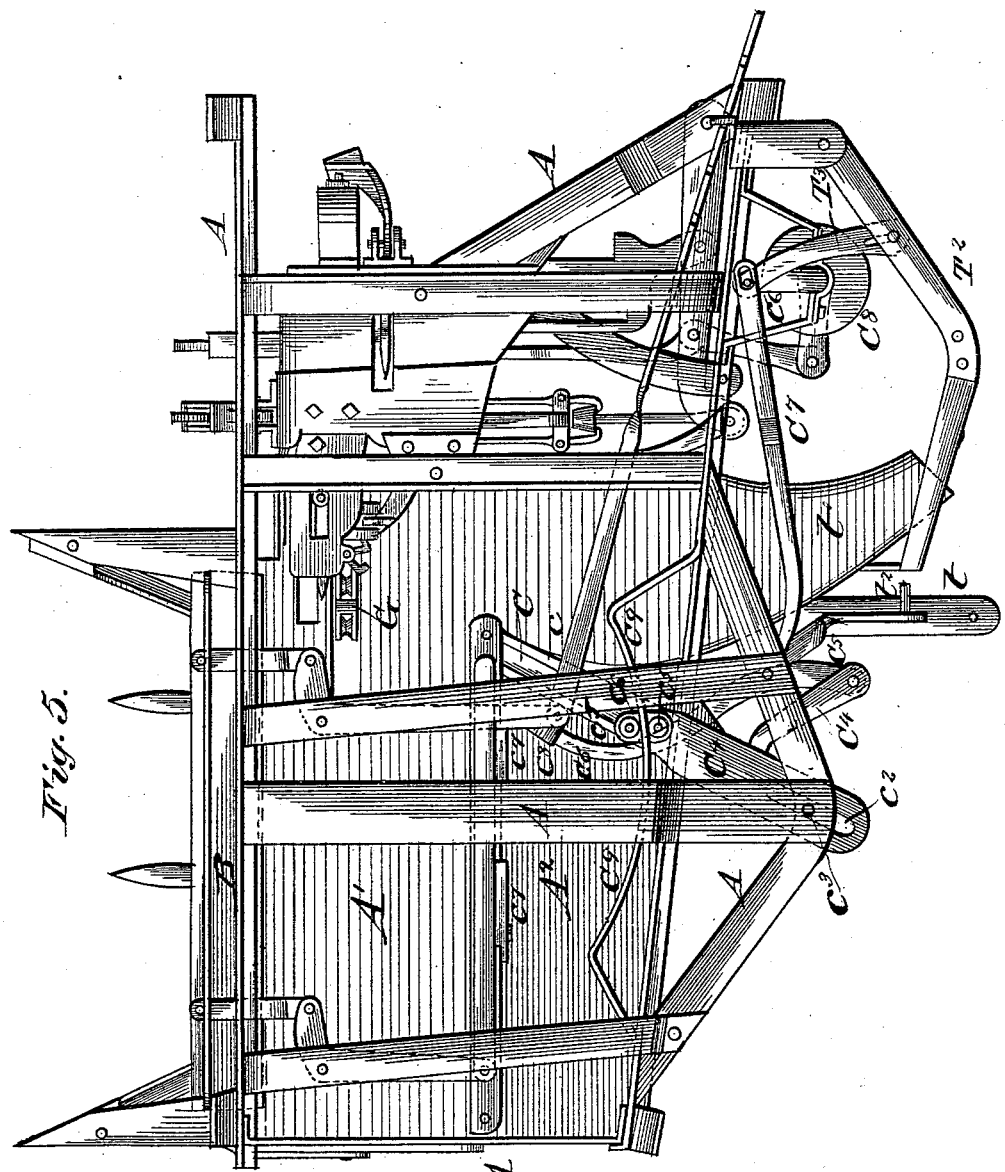

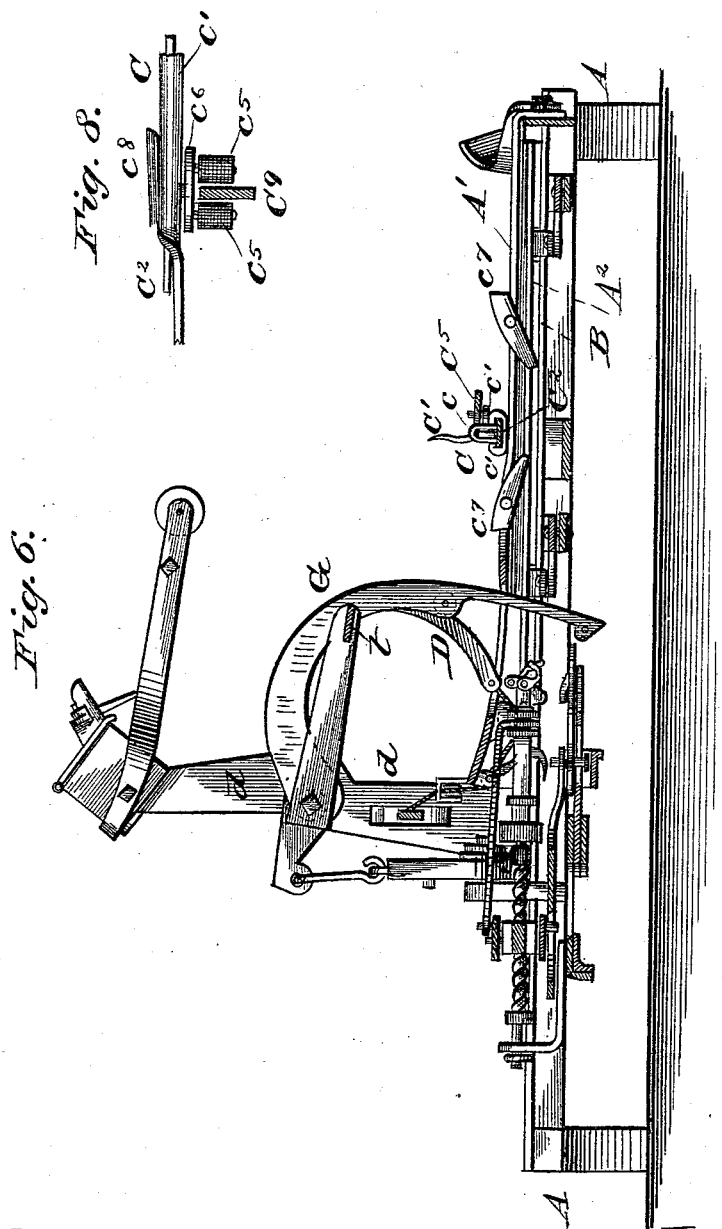

UNITED STATES PATENT OFFICE.

CHRISTOPHER LIDREN, OF LAFAYETTE, INDIANA, ASSIGNOR TO HIMSELF AND R. JACKSON, OF SAME PLACE.

HARVESTER-RAKE.

SPECIFICATION forming part of Letters Patent No. 278,979, dated June 5, 1883.

Application filed November 20, 1882. (Model.)

*To all whom it may concern:*

Be it known that I, CHRISTOPHER LIDREN, of Lafayette, in the State of Indiana, have invented certain new and useful Improvements in Harvester-Rakes; and I do hereby declare that the following is a full, clear, and exact description thereof, reference being had to the accompanying drawings, and to the letters of reference marked thereon, which form part of this specification, in which—

Figure 1 is a top view of a harvester having my improved raking mechanism applied, also showing a grain-binding apparatus. Fig. 2 is a front elevation. Fig. 3 is an elevation of one end of the machine. Fig. 4 is a plan view of the machine with the platforms removed. Fig. 5 is a bottom view of the machine. Fig. 6 is a vertical transverse section taken through the machine in the plane indicated by dotted line $x$ $x$ on Fig. 1. Figs. 7 and 8 are sectional details of the rake which moves the loose grain to a binding apparatus.

My invention relates to rakes for moving the loose grain across the platform to a grain-binding mechanism, and then discharging the sheaves from the machine.

My invention consists, in general terms, of a rake and rake-operating mechanism, whereby, as the rake sweeps the grain-platform and carries the grain forward to be bound, the rake shall move in a straight course over the platform with its teeth upright, and as soon as it has delivered the gavel to a compressor it shall move backward and swing around to its first position with its teeth dropped, thereby returning above the platform after it has delivered the gavel. Also, to a rake which is reciprocated automatically at right angles to the sheaf-rake, and which operates in harmony with it for removing the sheaves from the binding mechanism and discharging them from the machine.

The following particular description, when taken in connection with the annexed drawings, will enable others skilled in the art to fully understand the same.

By reference to the annexed drawings it will be seen that I have represented in connection with my raking devices a compressing and binding apparatus. This I shall describe in general terms, and refer to it only in so far as it has any relation to the rakes, for the reason that said apparatus forms the subject of my application for Letters Patent filed September 26, 1882, and is not herein claimed.

The various parts of the main frame are indicated by the letter A, and are constructed and arranged so as to constitute suitable supports for the various operative devices which will now be described.

B designates the finger-bar, which is movable forward and back below the front platform, A'. A² designates a secondary platform, which extends partly over the platform A', leaving a space for the operation of the gavel-rake. The movable finger-bar is not claimed in this application, as it is fully described and claimed in my application above referred to.

C designates the rake which is employed for sweeping the platform and moving the grain forward to a compressing-arm, D, and a cord-carrying binding-arm, G, which have their fulcra on a post, $d$, located at the inner end of the platform A' and front end of the platform $t'$. The rake-teeth C' are pivoted to one of a pair of parallel flanges, or to one of the walls of a longitudinal channel which is formed at the outer end of a sliding bar, C². The butt-ends of the rake-teeth C' are pivotally connected to a second and somewhat smaller slide-bar, C³, which works in the said channel in the slide-bar C², and also through guides $c$ $c$, formed with or attached to said bar. The slide-bar C² works in suitable guides, $c'$, on an oscillating bar, C⁴, which is provided at its rear end with a slot, $c^2$, and pivoted to the main frame by means of a pivot, $c^3$, which passes through said slot and is secured to the rear bar of the said main frame A. This mode of connection admits of a limited longitudinal play on the part of the bar C⁴, as well as an oscillatory or swinging movement thereof. To the said oscillatory bar C⁴ is pivoted a bell-crank lever, $c^4$, the longest arm of which is connected to the small slide-bar C³ by means of a connecting-rod, C⁵. The remaining arm of the bell-crank lever $c^4$ is connected to a crank-arm, C⁶, by means of a connecting-rod, C⁷, said crank-arm being fixed upon the axle of a sprocket-wheel, C⁸. The sprocket-wheel C⁸ will be connected by an endless chain with a similar wheel upon one of the main supporting and driving wheels of the harvester, and constitutes the source from which power is derived for driving and operating the several devices herein shown.

$C^9$ indicates a stationary curved guide, which is secured to the main frame A below the oscillating bar $C^4$; and $c^5$ denotes a pair of antifriction rollers carried by a plate, $c^6$, which is pivoted to the under side of said oscillating bar. These rollers $c^5$ embrace the sides of the curved guide-bar $C^9$, so that as the bar $C^4$ is swung about its pivot it will be alternately retreated and advanced to an extent which is limited by the length of its slot $c^2$.

$c^7$ designates a pair of dogs or stops, which are pivoted to the rear edge of the grain-platform A′, and adapted to be engaged at certain periods of the rake movements by a projection, $c^8$, upon the slide-bar $C^2$, for the purpose of facilitating the rise and fall of the rake-teeth C′. After the gavel-rake has been swung away from the binding-arms D G and carried to the grain side of the machine, the slide-bar $c^2$ will be in a retracted position upon the bar $C^4$, and the slide-bar $C^3$ will be retracted upon the bar $C^2$ with the rake-teeth lowered. As the bell-crank lever upon the oscillating bar $C^4$ is caused to vibrate by reason of the rod $C^7$ pulling upon its short arm, the connecting-rod $C^5$, pivoted to the remaining arm of the bell-crank lever, will first throw the slide-bar $C^3$ forward so as to raise the rake-teeth C′. A lug, $b^5$, on the slide-bar $C^3$, to which the forward end of connecting-rod $C^5$ is pivoted, strikes a projection, $a$, on the slide-bar $C^2$ during the forward movement of the slide-bar, which is connected to the lower ends of the teeth, and throws the slide-bar $C^2$ forward, thus bringing the rake into position for carrying the gavel over the platform A′. After the rake has traversed the platform the connecting-rod $C^5$ will retract the bar $C^3$, causing the teeth C′ to drop and the lug $b^5$ on said bar to abut against the inner guide, $c$, on slide-bar $C^2$, thereby retracting said bar, and also causing the said bars and the rake to be swung back to the first position. By reason of the slot $c^2$ in the oscillating bar $C^4$, and the curved guide $C^9$, against which its rollers bear, the forward end of said bar will during its oscillating movements traverse the platform in substantially a straight line, instead of in the arc of a circle, thereby keeping the rake projected forward to the same extent during the process of carrying the gavel up to the compressing and binding arms. When the bar $C^2$ is extended its stop $c^8$ will strike one of the pivoted dogs $c^7$ and ride over the same, whereby the raising of the rake-teeth to an upright position will be insured. After the gavel has been delivered, and while the slide-bar $C^2$ is being retracted, its said stop will strike the remaining pivoted dog, which will insure the rake-teeth being completely thrown down. As thus arranged, it will be seen that by reason of the bell-crank and the two connecting-rods the slide-bar $C^3$ is actuated so as to raise the rake-teeth C′ preparatory to sweeping the platform, and to lower the teeth after the gavel has been brought by the rake into position to be acted on by the compressing and binding arms. The extension or slide bar $C^2$ is thrown and held forward while the rake is sweeping the platform and retracted after the gavel has been brought up to said compressing and binding arms, and the oscillatory bar carrying the rake extension bar is caused to swing about its pivot.

T indicates the rake for carrying off the sheaves. This rake is pivoted to a slide, T′, which reciprocates on an elevated horizontal guide-bar, $t$, supported above the "way" or platform $t'$, which is a rear extension of the platform A. The slide T′, carrying the rake T, is connected to a lever, $T^2$, by means of a connecting-rod, $T^\times$, so that as the said lever is vibrated the slide and rake will be moved back and forth. The lever $T^2$ is pivoted at one end to the main frame, and is actuated by a connecting-rod, $T^3$, which connects the said lever $T^2$ to a crank-arm upon the axle of the sprocket-wheel $C^8$. The rod $T^3$ has a slotted connection with the lever $T^2$, so that this rod shall have a certain extent of motion before actuating lever $T^2$. A two-armed dog, $T^4$, is pivoted to the rake-slide, and two stops, $t^2$, are located on the bar $t$, or upon this bar and one of its supports, in the path of the lower arm of the dog $T^4$. When the slide T′ is drawn back, the lower arm of the dog strikes the rear stop, $t^2$, whereby the dog will be turned so that its upper arm will raise and hold up the rake. When the said slide is moved forward and the rake brought over the bound gavel, the lower arm of the dog will strike the forward stop, $t^2$, and thereby cause the dog to turn so as to trip the rake and allow it to engage with the gavel.

Having described my invention, what I claim as new, and desire to secure by Letters Patent, is—

1. In combination with a horizontally-vibrating rake-arm having vertically-vibrating rake-teeth, the grain-platforms A A², arranged in different horizontal planes, all adapted to operate substantially in the manner and for the purposes described.

2. The combination, with the oscillating bar $C^4$, of the slide-bar to which the rake-teeth are pivoted, guided in its longitudinal movements upon the oscillating bar, the slide-bar $C^3$, to which the rake-teeth are also pivoted, and the bell-crank lever and connecting-rod for operating the slide-bars and oscillating the bar by which they are supported, all adapted to operate substantially as described.

3. The combination, with the two slide-bars to which the rake-teeth are pivoted, of the slotted bar $C^4$, having an oscillatory and a longitudinal movement, and the curved guide-bar, which is embraced by two rollers carried by the oscillatory bar, whereby the longitudinal movements of the bar are effected and the rake is carried forward in a straight path over the platform, substantially as described.

4. The combination, with the two slide-bars to which the rake-teeth are pivoted, and means, substantially as described, for operating the same, of the pivoted dogs $c^7$, the lug $b^5$ on one of the slide-bars, and the projection $a$ on the remaining slide-bar, said lug and projection during the operation respectively coming in contact with a pivoted dog, substantially as described, and for the purposes specified.

5. The combination, with the pivoted rake for carrying off the bound gavel, of the slide to which the rake is pivoted, carrying a pivoted two-armed dog, and the stops located so that as the rake is moved forward one of said stops will actuate the dog and allow the rake to drop, and when the rake is carried back the remaining stop will actuate said dog so as to raise and hold up the rake, substantially as described.

In testimony that I claim the foregoing as my own I affix my signature in presence of two witnesses.

CHRISTOPHER LIDREN.

Witnesses:
M. E. SHERRY,
JOHN D. GOUGAR.